(12) United States Patent
Suu et al.

(10) Patent No.: US 8,887,153 B2
(45) Date of Patent: Nov. 11, 2014

(54) DIGITAL SIGNATURE SERVER AND USER TERMINAL

(75) Inventors: Hiroshi Suu, Chigasaki (JP); Akira Miura, Sagamihara (JP); Akihiro Kasahara, Chiba (JP); Shinichi Matsukawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 362 days.

(21) Appl. No.: 13/511,193

(22) PCT Filed: Nov. 25, 2009

(86) PCT No.: PCT/JP2009/069843
§ 371 (c)(1),
(2), (4) Date: Aug. 6, 2012

(87) PCT Pub. No.: WO2011/064844
PCT Pub. Date: Jun. 3, 2011

(65) Prior Publication Data
US 2013/0132728 A1 May 23, 2013

(51) Int. Cl.
*H04L 9/32* (2006.01)
*H04L 9/08* (2006.01)

(52) U.S. Cl.
CPC ............ *H04L 9/3281* (2013.01); *H04L 9/3247* (2013.01); *H04L 9/0825* (2013.01)
USPC ........................................................ 717/176

(58) Field of Classification Search
CPC .... H04L 9/0825; H04L 9/3247; H04L 9/3281
See application file for complete search history.

(56) References Cited

U.S. PATENT DOCUMENTS 5,850,446 A * 12/1998 Berger et al. .................. 705/79
6,002,767 A * 12/1999 Kramer ........................... 705/79
(Continued)

FOREIGN PATENT DOCUMENTS

CN 101035135 A 9/2007
CN 101166089 A 4/2008
(Continued)

OTHER PUBLICATIONS

Office Action issued by The State Intellectual Property Office of the People's Republic of China on Apr. 24, 2014, for Chinese Patent Application No. 200980162596.2, and English-language translation thereof.
(Continued)

*Primary Examiner* — Haresh N Patel
(74) *Attorney, Agent, or Firm* — Finnegan, Henderson, Farabow, Garrett & Dunner, L.L.P.

(57) ABSTRACT

To reduce a load on a user terminal imposed when verifying signature data and at the same time reduce a load on a server, a signature key matrix KM includes a plurality of signature keys Ki-j arranged in a matrix structure of m rows and n columns, and is stored in a signature key matrix database 21. A correspondence relationship between a signature key set CK which is an aggregate of any signature keys selected from the n columns respectively and a user terminal 30 is stored in a correspondence relationship information database 22. A signature data generating unit 24 generates signature data having a matrix structure by encrypting a content digest D generated based on content data C by n number of signature keys included in the signature key matrix KM.

5 Claims, 5 Drawing Sheets

(56) References Cited

U.S. PATENT DOCUMENTS

| | | | |
|---|---|---|---|
| 6,163,772 A * | 12/2000 | Kramer et al. | 705/79 |
| 6,178,409 B1 * | 1/2001 | Weber et al. | 705/79 |
| 6,253,027 B1 * | 6/2001 | Weber et al. | 380/287 |
| 7,028,180 B1 * | 4/2006 | Aull et al. | 713/156 |
| 7,191,333 B1 * | 3/2007 | Maddury et al. | 713/174 |
| 7,557,941 B2 * | 7/2009 | Walmsley | 358/1.14 |
| 7,631,190 B2 * | 12/2009 | Walmsley | 713/176 |
| 7,757,086 B2 * | 7/2010 | Walmsley | 713/171 |
| 7,991,694 B2 * | 8/2011 | Takayama | 705/41 |
| 2006/0129806 A1 * | 6/2006 | Walmsley | 713/161 |
| 2006/0136725 A1 * | 6/2006 | Walmsley | 713/171 |
| 2006/0143454 A1 * | 6/2006 | Walmsley | 713/170 |
| 2007/0198838 A1 | 8/2007 | Nonaka et al. | |
| 2008/0016576 A1 | 1/2008 | Ueda et al. | |
| 2008/0034442 A1 | 2/2008 | Nonaka et al. | |
| 2008/0270796 A1 | 10/2008 | Suu et al. | |
| 2009/0125429 A1 * | 5/2009 | Takayama | 705/35 |

FOREIGN PATENT DOCUMENTS

| | | |
|---|---|---|
| CN | 101296363 A | 10/2008 |
| JP | 2006-74421 | 3/2006 |
| JP | 2006-284720 | 10/2006 |
| JP | 2007-164933 | 6/2007 |
| JP | 2008-176814 | 7/2008 |
| JP | 2008-269088 | 11/2008 |
| JP | 2009-194640 | 8/2009 |

OTHER PUBLICATIONS

International Search Report from Japanese Patent Office for International Application No. PCT/JP2009/069843, Mailed Feb. 23, 2010.

* cited by examiner

FIG. 2

Signature Key Matrix KM

| | First Column | Second Column | | n-th Column |
|---|---|---|---|---|
| First Row | K1-1 | K1-2 | ... | K1-n |
| Second Row | K2-1 | K2-2 | ... | K2-n |
| | ... | ... | ... | ... |
| m-th Row | Km-1 | Km-2 | ... | Km-n |

▨ ··· Signature Key Set

DIGITAL SIGNATURE SERVER AND USER TERMINAL

TECHNICAL FIELD

The present invention relates to a signature data server for generating signature data indicating that content data or the like is a certified one, and a user terminal which receives such signature data.

BACKGROUND ART

In recent years, with the development of the information-oriented society, it has become popular to use content data distribution systems which distribute content data, i.e., digitalized books, newspapers, music, motion pictures, etc., to user terminals and allow the content data to be enjoyed.

However, the easily-replicable nature of the digital content data often invites misconducts violating the copyrights. So-called pirate content, i.e., copies generated and distributed by such unauthorized activities, are widespread. From the viewpoint of protecting content data from such pirate content, the content data is encrypted, and in addition, sometimes affixed with signature data indicating that the content data is certified by an authorized provider. For example, such signature data is generated in a content distributor's server or a certifier's server by encrypting a hash value of the content data by an encryption key which is based on an asymmetric algorithm according to which different keys are used for encrypting and decrypting data. Here, the encryption key is referred to as a private key, and the decryption key a public key. The signature data is affixed to the content data and distributed to a user terminal. In order to verify the signature data, the user terminal decrypts the signature data by using the public key paired with the private key described above. If the hash value obtained by the decryption is identical with the hash value of the content data, the signature data is verified as a certified one (see Patent Document 1).

However, such a verification system requires that a decryption algorithm using the public key be implemented on the user terminal, which raises a problem that the load on the user terminal is increased. That is, a terminal such as a mobile phone, etc. having a low data processing capacity requires a long time for decryption. Meanwhile, another conceivable signature system is a system using an encryption/decryption key which is based on a symmetric algorithm imposing a less load than imposed by an asymmetric algorithm. Here, this encryption/decryption key is referred to as a secret key. Specifically, different secret keys are prepared for different user terminals, and a set of encrypted data obtained by encrypting a hash value of a content data by the respective secret keys is used as signature data. When verifying the signature data, a user terminal decrypts the signature data by its own secret key, and if the obtained result is identical with the hash value of the content data, verifies the signature data as a certified one. However, in this case, it is necessary to prepare secret keys that are different from user terminal to user terminal. Therefore, when building a content data distribution system for a large total number of user terminals, the signature data will have an enormous data size and cause faults when being distributed or recorded.

CONVENTIONAL ART DOCUMENT

Patent Document

Patent Document 1: JP-A 2006-284720

DISCLOSURE OF INVENTION

Problem to be Solved by the Invention

An object of the present invention is to provide a signature data server capable of reducing a load on a user terminal imposed when verifying signature data and at the same time reducing a load on the server itself, and a user terminal.

Means for Solving the Problem

A signature data server according to one aspect of the present invention is a signature data server for generating signature data indicating that content data is a certified one, including: a signature key column set database configured to store a signature key column set which is an aggregate of signature key columns each of which is an aggregate of a plurality of signature keys; a correspondence relationship information database configured to store correspondence relationship information indicating a correspondence relationship between a signature key set and a user terminal, the signature key set being an aggregate of any signature keys selected from the signature key columns respectively; and a signature data generating unit configured to generate signature data by encrypting a content digest by using the plurality of signature keys included in the signature key column set, the content digest being generated based on the content data.

A user terminal according to one aspect of the present invention is a user terminal for receiving, together with content data, signature data indicating that the content data is a certified one, including: a content data/signature data receiving unit configured to receive from outside, together with the content data, signature data generated by encrypting a content digest by a plurality of signature keys included in a signature key column set which is an aggregate of signature key columns each including a plurality of signature keys, the content digest being generated based on the content data; a signature key set receiving unit configured to receive from outside, a signature key set which is an aggregate of the signature keys selected one by one from the signature key columns of the signature key column set respectively; and a signature data verifying unit configured to verify the signature data by decrypting the content digest included in the signature data by using the signature keys included in the signature key set, and then comparing this content digest with a content digest obtained from the content data received from outside.

A signature data providing method according to one aspect of the present invention is a signature data providing method for generating signature data indicating that content data is a certified one and providing the signature data together with the content data to a user terminal, including generating signature data by encrypting a content digest by using a plurality of signature keys included in a signature key column set which is an aggregate of signature key columns each of which is an aggregate of a plurality of signature keys, the content digest being generated based on the content data; sending the signature data together with the content data to the user terminal; and sending a signature key set which is an aggregate of any signature keys selected from the columns of the signature key column set respectively to the user terminal.

Effect of the Invention

The present invention aims for providing a signature data server capable of reducing a load on a user terminal imposed when verifying signature data and at the same time reducing a load on the server itself, and a user terminal.

BRIEF DESCRIPTION OF THE DRAWINGS

FIG. 2 shows an example structure of a signature key matrix used for generating signature data according to an embodiment of the present invention.

BEST MODE FOR CARRYING OUT THE INVENTION

Next, an embodiment of the present invention will be explained in detail with reference to the drawings.

[Overall Configuration]

Figure 1:
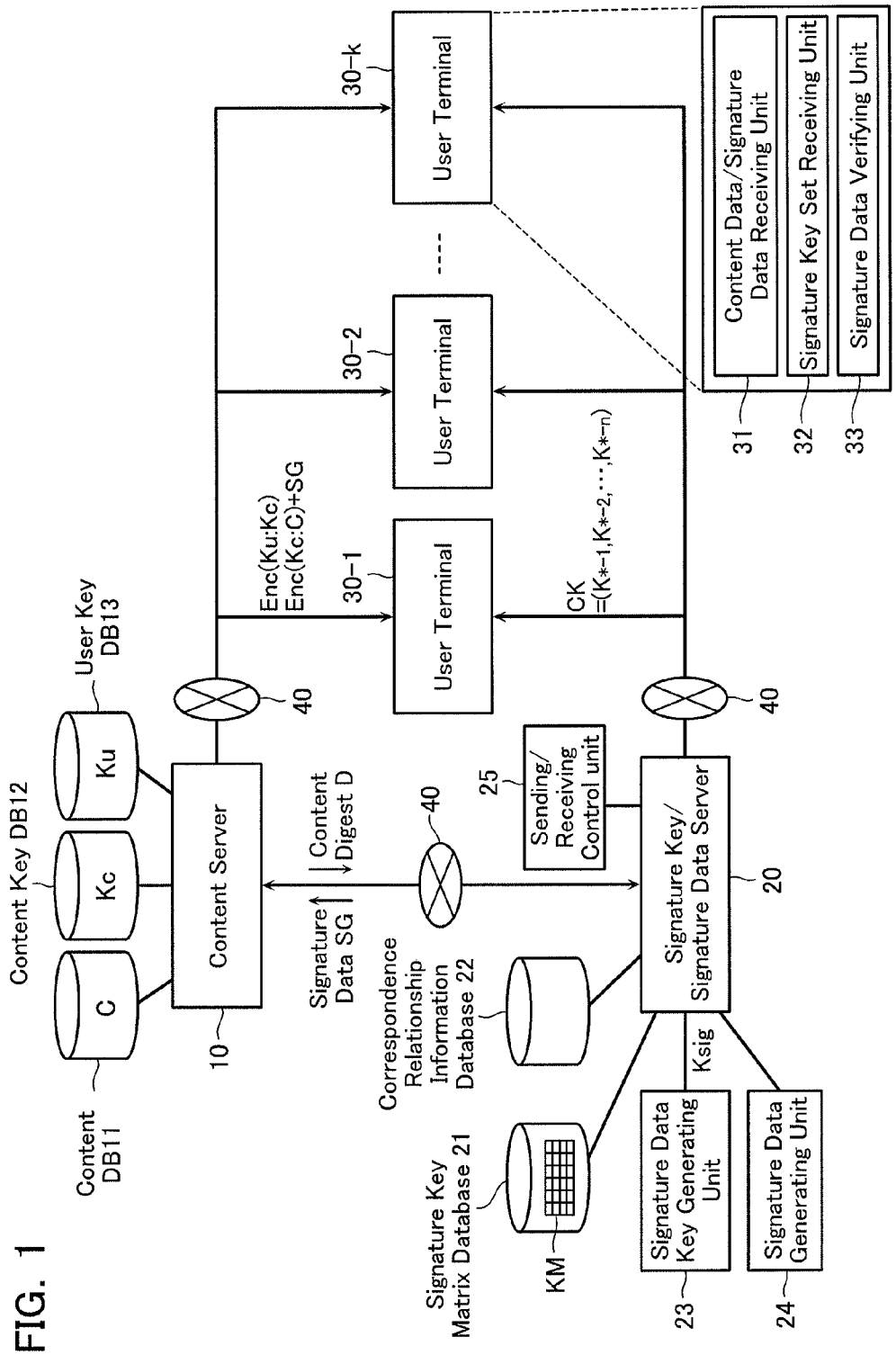
FIG. 1 is a block diagram showing an overall configuration of a system for distributing content data affixed with signature data according to an embodiment of the present invention.

FIG. 1 shows an overall configuration of a content data distribution system according to an embodiment of the present invention. The system is configured such that a content server 10, a signature key/signature data server 20, and user terminals 30 are connected through a network 40 to be capable of communicating with each other.

[Content Server 10]

The content server 10 has a function of distributing content data C together with signature data SG affixed thereto to a user terminal 30. As will be described later, the signature data SG is generated by the signature key/signature data server 20 and supplied to the content server 10. With the signature data SG affixed, the content data C is proved to have been distributed through a proper channel. Hence, this signature data SG contributes to eliminating pirate content.

For example, the content server 10 is connected to a content database 11, a content key database 12, and a user key database 13. The content database 11 is a database for storing various pieces of content data C. The content key database 12 is a database for storing content key data Kc for encrypting content data C. The user key database 13 is a database for storing user key data Ku for encrypting content key data Kc in association with, for example, a device ID unique to a user terminal 30, a recording medium ID of a recording medium connected to the user terminal 30, etc. The user key data Ku is data unique to each user, each user terminal, or each recording medium.

Content data C is distributed to a user terminal 30 after it is encrypted by content key data Kc and the content key data kc encrypted by user key data Ku. Hereinafter, content data C encrypted by content key data Kc will be denoted as "encrypted content data Enc(Kc:C)". Likewise, content key data Kc encrypted by user key data Ku will be denoted as "encrypted content key data Enc(Ku:Kc)".

[Signature Key/Signature Data Server 20]

The signature key/signature data server 20 is connected to a signature key matrix database 21 and a correspondence relationship information database 22, and includes a signature data key generating unit 23, a signature data generating unit 24, and a sending/receiving control circuit 25. The functions of each unit will be described later. The signature key/signature data server 20 has a function of having the signature data generating unit 24 generate signature data SG described above and supplying the generated signature data SG to the content server 10. The signature data SG is generated by encrypting a content digest D by a signature key Ki-j and a signature data key Ksig. A content digest D is data generated based on content data C to be authenticated, and has a value of a fixed length (e.g., approximately 16 bytes) with a small size calculated from the content data having a large size. For example, a hash value of encrypted content data Enc(Kc:C) may be the content digest D. For example, it is possible to have the content digest D supplied from the content server 10 through the sending/receiving control unit 25, but the present invention is not limited to this. It is possible to have the content digest D received from any other server or the like or generated by the signature key/signature data server 20 itself. The generated signature data SG is sent to the content server through the network 40 under an operation of the sending/receiving control unit 25.

As will be described later, the signature data key Ksig is used for encrypting data in the signature data SG (for example, the content digest D and any other signature key data), and encrypted by the signature key Ki-j. The signature data key Ksig is generated by the signature data key generating unit 23.

According to the present embodiment, for generating signature data SG, a signature key matrix KM (signature key columns) configured by a plurality of signature keys Ki-j (i=1 to m, j=1 to n) arranged in a matrix as shown in FIG. 2 is used. The signature key matrix KM is stored in the signature key matrix database 21.

In addition, in order for each user terminal 30 to verify the signature data SG, the signature key/signature data server 20 supplies a signature key set CK=(K*-1, K*-2, ..., K*-n) to the user terminal 30 through the network 40 under an operation of the sending/receiving control unit 25. The signature key set CK=(K*-1, K*-2, ..., K*-n) is an aggregate of n number of signature keys extracted one by one from the plurality of columns (signature key columns) of the signature key matrix KM respectively. Here, the notation "signature key K*-1" means any signature key extracted from the first column of the signature key matrix KM. Likewise, the notations "signature key K*-2", ..., "signature key K*-n" means any signature keys extracted from the second column, ..., the n-th column of the signature key matrix KM respectively. The combination of n number of signature keys in the signature key set CK is different from user terminal 30 to user terminal 30. Accordingly, the signature key set CK is used by each user terminal 30 as a secret key for decrypting the data in the signature data SG and verifying the signature data SG. Correspondence relationship information indicating a correspondence relationship between identification data (a device ID, a medium ID, etc.) of a user terminal 30 and a signature key set CK to be supplied to that user terminal 30 is stored in the correspondence relationship database 22.

[User Terminal 30]

The user terminal 30 includes a content data/signature data receiving unit 31, a signature key set receiving unit 32, and a signature data verifying unit 33.

In the user terminal 30, the content data/signature data receiving unit 31 receives encrypted content data Enc(Kc:C), encrypted content key data Enc(Ku:Kc), a user key Ku, and signature data SG from the content server 10. The signature key set receiving unit 32 receives a signature key set CK from the signature key/signature data server 20. The signature data verifying unit 33 verifies the signature data by decrypting the signature data SG using the signature key set CK and comparing the thusly obtained content digest D with a content digest D' generated from the received content data. When it is judged as a result of the comparison that both of them (D and D') are identical, the validity of the signature data SG is confirmed (the content data is judged to have been released by an authorized maker and not by a pirate content maker). When the validity of the signature data is not confirmed, the content data is judged not to have been released by an authorized maker and reproduction of the content data is prohibited, thereby preventing distribution of a pirate content.

In FIG. 1, the content server 10 and the signature key/signature data server 20 are configured as separate servers, but the present invention is not limited to this. The function of the content server 10 and that of the signature key/signature data server 20 may be achieved by one server.

[Data Structure of Signature Data SG]

Figure 3:
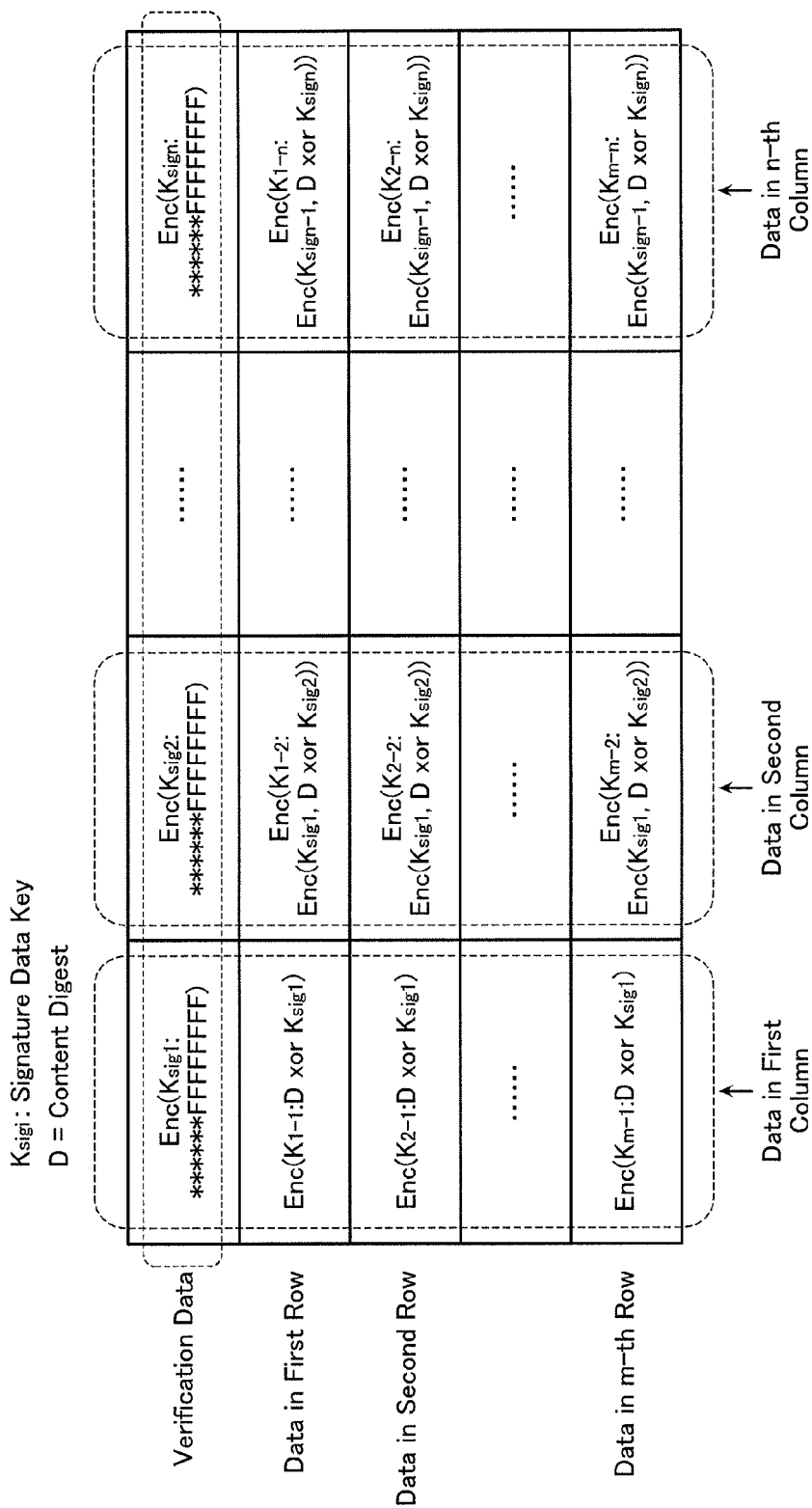
FIG. 3 shows one example of signature data generated according to an embodiment of the present invention.

Next, an example of the data structure of the signature data SG will be explained with reference to FIG. 3.

The signature data SG has a matrix structure of m rows and n columns like the signature key matrix KM. As will be described later, the signature data SG is decrypted in turns from the first column, the second column, the third column, ..., and finally the n-th column by the signature data verifying unit 33 using the signature key set CK. In the first column, exclusive OR data (D xor Ksig1) indicating XOR between the content digest D and a signature data key Ksig1 for the first column is encrypted by a signature key Ci-1 (i=1 to m) which is set in the first column of the signature key matrix KM.

Meanwhile, in the second and subsequent columns, i.e., in the j-th column (j=2 to n), the content digest D and a signature data key Ksigj (j=2 to n) for the j-th column are encrypted by the signature data key Ksigj-1 for the column preceding by one column to become encrypted data Enc (Ksigj-1:D xor Ksigj), and this encrypted data Enc (Ksigj-1:D xor Ksigj) is further encrypted by the signature key Ki-j (i=1 to m) for the j-th column.

In the topmost portion of each column of the signature data SG, verification data indicating that the signature data SG is a proper one is stored. The verification data is stored in the form of encrypted data obtained by encrypting a verification value ****FFFFFFFF (where ** is any value, and FFFFFFFF is a predetermined fixed value portion and not limited to FFFFFFFF) by the signature data key Ksigj prepared for each column. This encrypted verification value **FFFFFFFF is decrypted by using the signature data key Ksigj. For example, the user terminal 30 judges whether or not the fixed value portion of the decrypted verification value indicates a predetermined fixed value. This verification value ****FFFFFFFF together with the content digest D contributes to the judgment of the properness of the signature data SG.

If the given content data C is identical, the data structure of the signature data SG is common to all user terminals 30. However, the user terminals 30 are supplied with different signature key sets CK respectively. As described above, the signature key set CK is an aggregate of a total of n number of signature keys Ki-j extracted one by one from the n number of columns of the signature key matrix KM respectively. By setting the signature key set CK differently for each user terminal 30, it is possible to give the system, based on one signature key matrix KM of m rows and n columns, the same condition as that achieved by issuing $m^n$ patterns of secret keys. According to a conventional symmetric algorithm scheme, it is possible to deal with only m×n number of user terminals based on m×n number of signature keys (secret keys). That is, according to the present embodiment, by generating signature data SG by using the signature key matrix KM including m×n signature keys arranged in a matrix while by supplying the user terminal 30 with a signature key set CK which is an aggregate of signature keys selected one by one from the respective columns of the signature key matrix KM described above, it is possible to supply different signature keys to $m^n$ number of user terminals based on m×n number of signature keys. Accordingly, a larger number of user terminals can be used, given that the number of signature keys is fixed. Meanwhile, since the user terminal 30 can verify the signature data SG by a symmetric algorithm using the signature key set CK, the user terminal 30 can get off with a remarkably less computing load than imposed when using an asymmetric algorithm scheme.

In addition, the signature key set CK is different from user terminal 30 to user terminal 30. Therefore, even if the signature key set CK is stolen from one user terminal 30, such a signature key set CK is merely a part of the signature key matrix KM, and it is impossible to generate signature data that can be verified by other user terminals. The signature key matrix KM is never sent to the outside of the signature key/signature data server 20. Therefore, as long as the signature key matrix KM is kept under strict control, no signature data SG will be generated outside of the signature key/signature data server 20.

Figure 4:
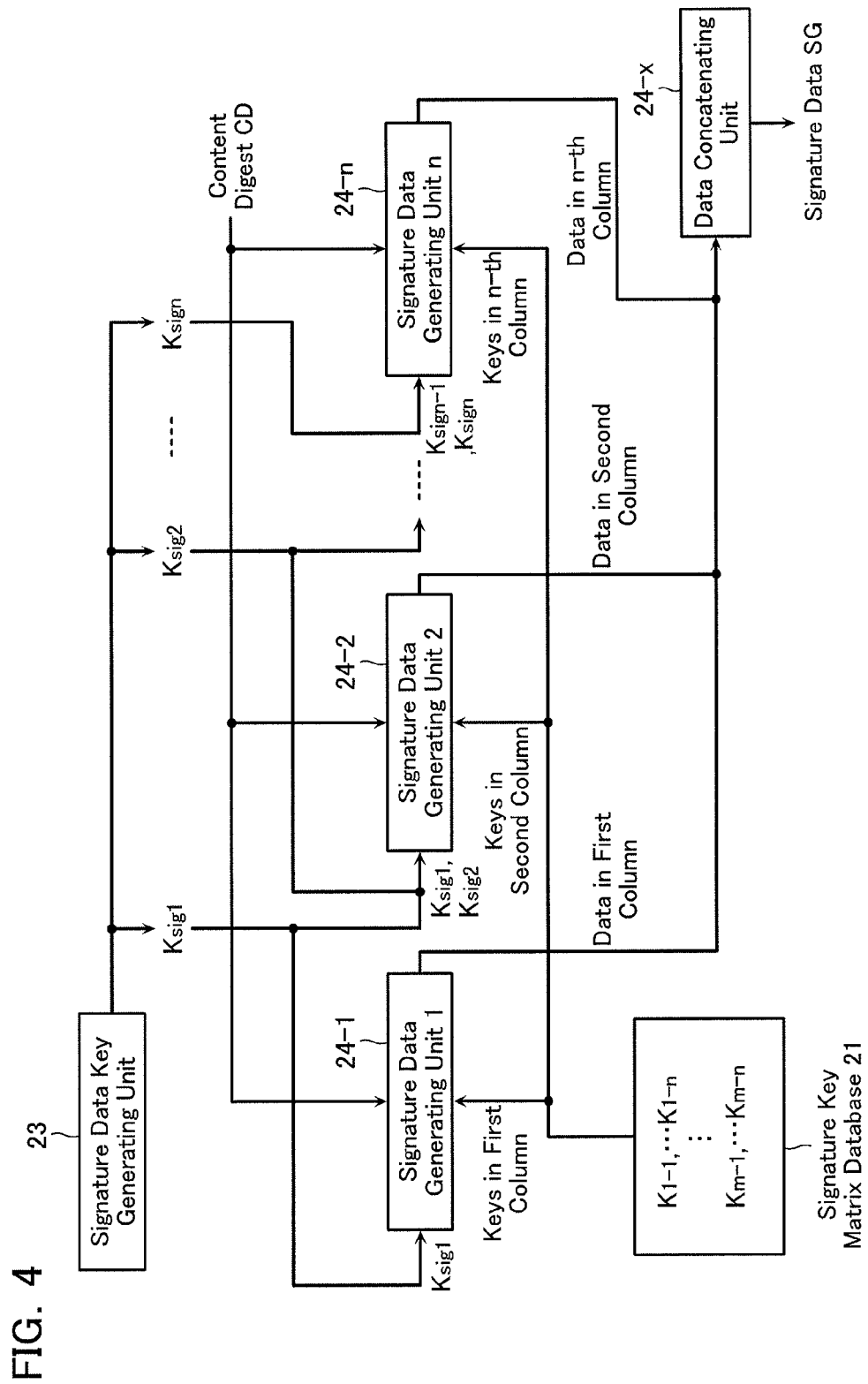
FIG. 4 shows one example of a signature data generating process executed by a signature key/signature data server 20 of FIG. 1.

An operation of the signature key/signature data server 20 for generating signature data SG will be explained with reference to the block diagram of FIG. 4. In FIG. 4, the signature data generating unit 24 is explained as being configured by n number of signature data generating units 24-1 to 24-n and a data concatenating unit 24x.

The signature data generating unit 24-1 calculates exclusive OR data (D xor Ksig1) between the signature data key Ksig1 for the first column and the content digest D, and then encrypts the exclusive OR data by using the signature key Ki-1 (i=1 to m) which is set in the first column of the signature key matrix KM to generate encrypted data Enc (Ki-1:D xor Ksig1). Further, the signature data generating unit 24-1 encrypts the verification value ******FFFFFFFF by the signature data key Ksg1 for the first column.

The signature data generating unit 24-j (j≥2) for the second and subsequent columns calculates exclusive OR data (D xor Ksigj) between the signature data key Ksigj for the j-th column and the content digest D, and encrypts the exclusive OR data by the signature data key Ksigj-1 for the (j−1)th column (i.e., the column preceding by one column) to generate encrypted data Enc(Ksigj-1:D xor Ksigj). The signature data generating unit 24-j further encrypts this encrypted data by the signature key Ki-j for the j-th column. Further, the signature data generating unit 24-j encrypts the verification value ******FFFFFFFF by the signature data key Ksigj for the j-th column. The data concatenating unit 24-x concatenates the encrypted data of the respective columns generated by the above operations to generate signature data SG having a matrix structure shown in FIG. 3.

Figure 5:
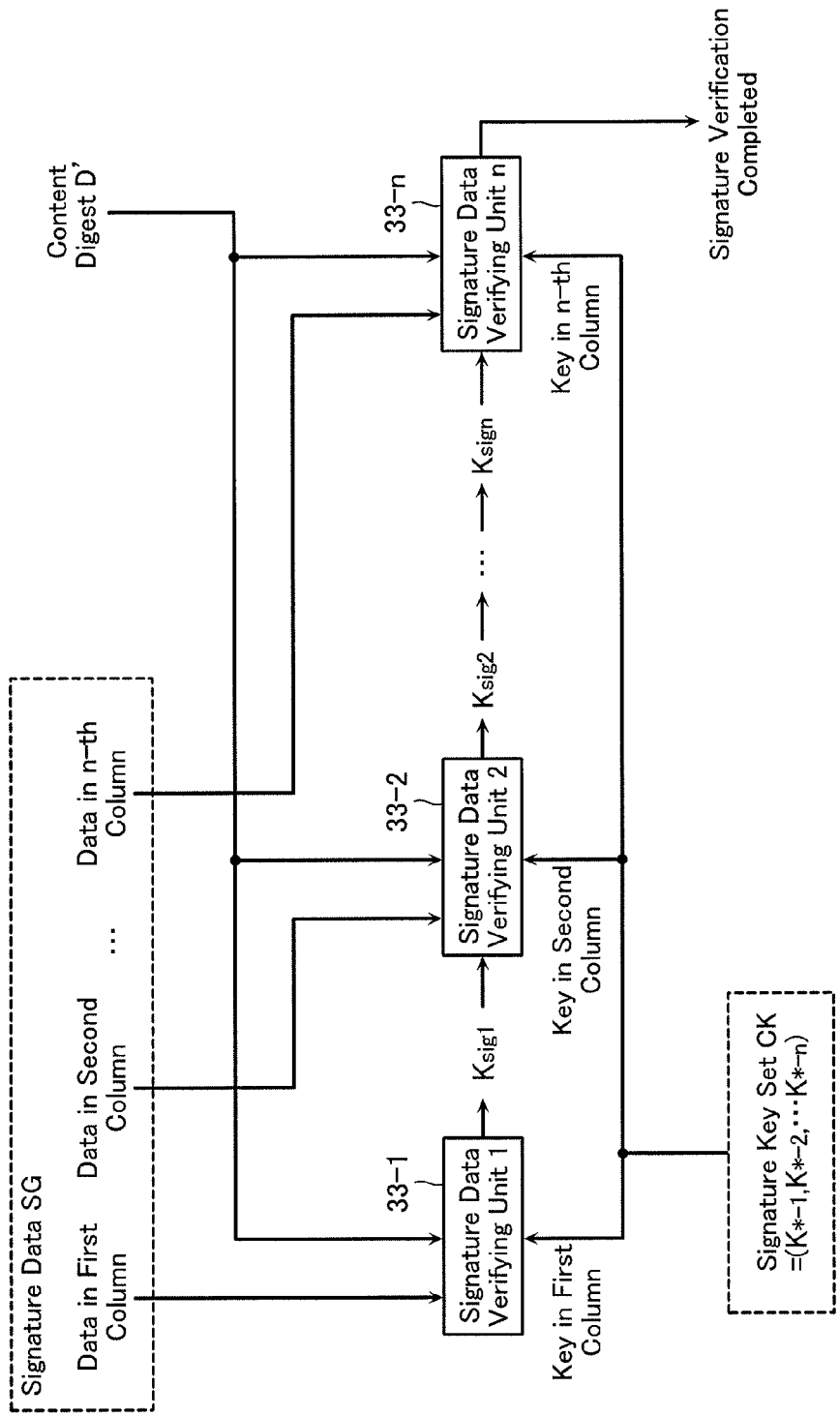
FIG. 5 is a block diagram showing a process for verifying signature data SG executed by a user terminal 30 of FIG. 1.

Next, an operation of the user terminal 30 for verifying the signature data SG will be explained with reference to FIG. 5. In FIG. 5, the signature data verifying unit 33 is explained as including j number of signature data verifying units 33-j (j=1 to n) for decrypting data in the j-th column of the signature data SG.

First, the signature data verifying unit 33-1 executes decryption by receiving data in the first column of the signature data SG and the signature key K*-1 in the first column of the signature key set CK. The signature data verifying unit 33-1 compares the content digest D obtained from the decryption with the content digest D' to judge whether they are identical, and also obtains the signature data key Ksig1. The signature data key Ksig1 is sent to the signature data verifying unit 33-2 because it is used for decrypting the signature data in the second column. As described above, in the second and subsequent columns of the signature data SG, the content digest D and the signature data key Ksigj are encrypted doubly by the signature data key Ksigj-1 for the column preceding by one column and the signature key Ki-j. Hence, the signature data verifying unit 33-*j* (j≥2) for the second and subsequent columns executes decryption by receiving the signature key set CK, and in addition, receiving the signature data key Ksigj-1 for the column preceding by one column from the preceding signature data verifying unit 33-*j*-1. In this way, the content digest D is verified in each column in turns and the operation of verifying the signature data SG is thus completed.

Though the embodiment of the present invention having been described, the present invention is not limited to this, but various alterations can be made thereonto without departing from the scope of the spirit of the invention. For example, in the embodiment described above, exclusive OR data between the content digest D and the signature data key Ksigj is calculated in the signature data SG. However, it needs not be an exclusive OR that is calculated, but it may be the result of any other logical operation that is encrypted. The signature key matrix KM may be replaced by an aggregate of signature key columns that is obtained by gathering plural signature key columns. Each of the signature key columns may include plural unused signature keys.

DESCRIPTION OF REFERENCE NUMERALS

10 content server
20 signature key/signature data server
30 user terminal
KM signature key matrix

The invention claimed is:

1. A signature data server operative to generate signature data indicating that content data is a certified one, comprising:
a signature key column set database configured to store a signature key column set which is an aggregate of signature key columns each of which is an aggregate of a plurality of signature keys;
a correspondence relationship information database configured to store correspondence relationship information indicating a correspondence relationship between a signature key set and a user terminal, the signature key set being an aggregate of any signature keys selected from the signature key columns respectively; and
a signature data generating unit configured to generate signature data by encrypting a content digest by using the plurality of signature keys included in the signature key column set, the content digest being generated based on the content data.

2. The signature data server according to claim 1, further comprising a sending/receiving control unit configured to send the signature data to a content server for providing content data to the user terminal and receive the content digest from the content server.

3. The signature data server according to claim 1, further comprising a signature data key generating unit configured to generate a plurality of different signature data keys corresponding to a plurality of columns of the signature data respectively,
wherein in each of the plurality of columns, the signature data generating unit encrypts the signature data key corresponding to that column by using the signature keys.

4. The signature data server according to claim 3,
wherein in a first column of the signature data, the signature data generating unit encrypts the content digest and the signature data key corresponding to the first column by using the signature keys, whereas in a j-th column (j≥2) of the signature data, the signature data generating unit generates encrypted data by encrypting the content digest and the signature data key corresponding to the j-th column by using the signature data key corresponding to a (j−1)th column, and further encrypts the encrypted data by using the signature keys.

5. The signature data server according to claim 1,
wherein the signature data generating unit encrypts a verification value used for verifying the signature data by the signature data key.

* * * * *